(12) United States Patent  
Armelin et al.

(10) Patent No.: US 12,069,077 B2  
(45) Date of Patent: Aug. 20, 2024

(54) METHODS FOR DETECTING A CYBERATTACK ON AN ELECTRONIC DEVICE, METHOD FOR OBTAINING A SUPERVISED RANDOM FOREST MODEL FOR DETECTING A DDoS ATTACK OR A BRUTE FORCE ATTACK, AND ELECTRONIC DEVICE CONFIGURED TO DETECT A CYBERATTACK ON ITSELF

(71) Applicant: Sony Group Corporation, Tokyo (JP)

(72) Inventors: Gabriel Armelin, Stuttgart (DE); Erbin Lim, Stuttgart (DE); Francesco Cartella, Stuttgart (DE); Gert Ceulemans, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 318 days.

(21) Appl. No.: 17/625,350

(22) PCT Filed: Jun. 3, 2020

(86) PCT No.: PCT/EP2020/065384  
§ 371 (c)(1),  
(2) Date: Jan. 7, 2022

(87) PCT Pub. No.: WO2021/018440  
PCT Pub. Date: Feb. 4, 2021

(65) Prior Publication Data  
US 2022/0263846 A1   Aug. 18, 2022

(30) Foreign Application Priority Data  
Jul. 26, 2019   (EP) .................................... 19188489

(51) Int. Cl.  
*H04L 9/40* (2022.01)

(52) U.S. Cl.  
CPC ...... *H04L 63/1425* (2013.01); *H04L 63/1458* (2013.01); *H04L 2463/141* (2013.01)

(58) Field of Classification Search  
CPC ............. H04L 63/1425; H04L 63/1458; H04L 2463/141  
See application file for complete search history.

(56) References Cited

U.S. PATENT DOCUMENTS

| | | |
|---|---|---|
| 10,212,174 B2 | 2/2019 | Muddu et al. |
| 10,212,182 B2 | 2/2019 | Wetterwald et al. |

(Continued)

FOREIGN PATENT DOCUMENTS

CN   108696543 A   10/2018

OTHER PUBLICATIONS

International Search Report and Written Opinion mailed on Jul. 7, 2020, received for PCT Application PCT/EP2020/065384, Filed on Jun. 3, 2020, 9 pages.

(Continued)

*Primary Examiner* — Stephen T Gundry  
(74) *Attorney, Agent, or Firm* — XSENSUS LLP

(57) ABSTRACT

A method for detecting a cyberattack on an electronic device is provided. The method is performed by the electronic device itself. The method includes collecting data at the electronic device. Further, the method includes classifying the collected data as regular data or malicious data using a supervised machine-learning model for the cyberattack. The method additionally includes determining whether the electronic device is under the cyberattack based on the classification of the collected data.

20 Claims, 6 Drawing Sheets

(56) References Cited

U.S. PATENT DOCUMENTS

| | | | |
|---|---|---|---|
| 11,399,035 B1* | 7/2022 | Batchu | H04L 63/1483 |
| 11,611,532 B1* | 3/2023 | Haefner | H04L 63/1425 |
| 11,757,907 B1* | 9/2023 | Berger | H04L 63/1425 |
| | | | 726/23 |
| 11,829,866 B1* | 11/2023 | Feinstein | G06N 3/0455 |
| 11,848,827 B1* | 12/2023 | Haefner | H04L 41/142 |
| 2013/0104230 A1* | 4/2013 | Tang | G06F 21/552 |
| | | | 726/23 |
| 2018/0063188 A1* | 3/2018 | Karin | H04L 63/1458 |
| 2018/0337945 A1* | 11/2018 | Takabe | H04L 63/1425 |
| 2019/0018956 A1 | 1/2019 | Sadaghiani et al. | |
| 2020/0304524 A1* | 9/2020 | Weinberger | H04L 63/1425 |
| 2022/0159020 A1* | 5/2022 | Wang | H04L 43/062 |
| 2022/0232042 A1* | 7/2022 | Crabtree | H04L 63/1425 |
| 2022/0245524 A1* | 8/2022 | Pihur | G06N 5/04 |
| 2022/0263860 A1* | 8/2022 | Crabtree | H04L 63/1425 |
| 2022/0272100 A1* | 8/2022 | Carnes, III | H04L 63/101 |
| 2022/0351024 A1* | 11/2022 | Khayrallah | G06N 3/063 |
| 2023/0007042 A1* | 1/2023 | Haworth | H04L 63/205 |
| 2023/0054625 A1* | 2/2023 | Peroulas | H04W 24/08 |
| 2023/0080471 A1* | 3/2023 | Jenkinson | H04L 63/14 |
| | | | 726/23 |
| 2023/0095415 A1* | 3/2023 | Boyer | H04L 63/1408 |
| | | | 726/23 |
| 2023/0171276 A1* | 6/2023 | Bisht | G06F 16/906 |
| 2023/0208869 A1* | 6/2023 | Bisht | G06N 7/01 |
| | | | 726/23 |
| 2023/0370439 A1* | 11/2023 | Crabtree | H04L 63/0428 |

OTHER PUBLICATIONS

Alkasassbeh et al., "Detecting Distributed Denial of Service Attacks Using Data Mining Techniques", International Journal of Advanced Computer Science and Applications, vol. 7, No. 1, 2016, pp. 436-445.

* cited by examiner

METHODS FOR DETECTING A CYBERATTACK ON AN ELECTRONIC DEVICE, METHOD FOR OBTAINING A SUPERVISED RANDOM FOREST MODEL FOR DETECTING A DDoS ATTACK OR A BRUTE FORCE ATTACK, AND ELECTRONIC DEVICE CONFIGURED TO DETECT A CYBERATTACK ON ITSELF

CROSS-REFERENCE TO RELATED APPLICATIONS

The present application is based on PCT filing PCT/EP2020/065384, filed Jun. 3, 2020, which claims priority to EP 19188489.9, filed Jul. 26, 2019, the entire contents of each are incorporated herein by reference.

FIELD

The present disclosure relates to detecting cyberattacks using machine-learning models. In particular, examples relate to methods for detecting a cyberattack on an electronic device, a method for obtaining a supervised Random Forest model for detecting a Distributed Denial-of-Service (DDoS) attack or a brute force attack, and an electronic device configured to detect a cyberattack on itself.

BACKGROUND

A cyberattack is any type of offensive action launched from one or more computers by a cybercriminal and targets other computers or computer networks in order to steal data, espionage, sabotage and/or demand ransoms. In general, cyberattacks may be broken down into two categories: 1) attacks to disable the target computer or service, and 2) attacks to get access to the target computer or computer network. An example of the first category of cyberattacks is a Simple Service Discovery Protocol (SSDP) reflection and amplification attack. A brute force attack is an example for the second category of cyberattacks.

There is a desire to detect cyberattacks.

SUMMARY

This desire is met by apparatuses and methods in accordance with the independent claims. Advantageous embodiments are addressed by the dependent claims.

According to a first aspect, the present disclosure provides a method for detecting a cyberattack on an electronic device. The method is performed by the electronic device itself. The method comprises collecting data at the electronic device. Further, the method comprises classifying the collected data as regular data or malicious data using a supervised machine-learning model for the cyberattack. The method additionally comprises determining whether the electronic device is under the cyberattack based on the classification of the collected data.

According to a second aspect, the present disclosure provides another method for detecting a cyberattack on an electronic device. The method is performed by the electronic device. The method comprises collecting data at the electronic device. Further, the method comprises analyzing the collected data using a supervised Random Forest model for the cyberattack in order to determine whether the electronic device is under the cyberattack.

According to a third aspect, the present disclosure provides a method for obtaining a supervised Random Forest model for detecting a DDoS attack or a brute force attack. The method comprises extracting one or more features of the DDoS attack or the brute force attack from collected data of the DDoS attack or the brute force attack. Further, the method comprises obtaining the supervised Random Forest model by learning a plurality of decision trees using the one or more features of the DDoS attack or the brute force attack extracted from the collected data of the DDoS attack or the brute force attack.

According to a fourth aspect, the present disclosure provides an electronic device configured to detect a cyberattack on itself. The electronic device comprises a network interface for exchanging data with a communication network. Further, the electronic device comprises a processing circuit configured to collect data at the electronic device. The processing circuit is configured to classify the collected data as regular data or malicious data using a supervised machine-learning model for the cyberattack. Additionally, the processing circuit is configured to determine whether the electronic device is under the cyberattack based on the classification of the collected data.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
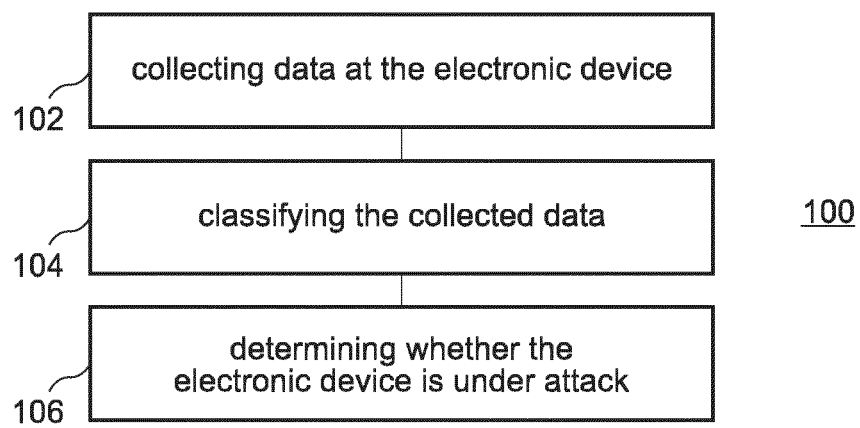
FIG. 1 illustrates a flowchart of an example of a method for detecting a cyberattack on an electronic device.

FIG. 1 illustrates a flowchart of an example of a method 100 for detecting a cyberattack on an electronic device. Method 100 is performed by the electronic device itself. In other words, method 100 is a method for edge computing. The electronic device may be any physical entity comprising electronic circuitry capable of exchanging data with one or more communication networks such as a Local Area Network (LAN), a Wireless LAN (WLAN), a Metropolitan Area Network (MAN), a Wide Area Network (WAN), a Global Area Network (GAN) or the Internet. The electronic device may comprise further circuitry—conventional and/or custom. For example, electronic device may be an Internet-of-Things (IoT) device. An IoT device is an electronic device that is capable of connecting to the Internet, and to receive, transmit and process data.

Method 100 comprises collecting 102 data at the electronic device for analysis. The data is data present at the electronic device. For example, the collected data may be data received by the electronic device or data generated by the electronic device.

Further, method 100 comprises classifying 104 the collected data as regular data or malicious data using a supervised machine-learning model for the cyberattack. Malicious data is data that, when introduced to the electronic device, will cause the electronic device to perform undesired actions. On the contrary, regular data is data generated, received, transmitted or processed during regular operation of the electronic device. Malicious data may be a hint for a cyberattack on the electronic device.

The supervised machine-learning model for the cyberattack may be any model representing a learned function that maps the input collected data as regular data or malicious data. The mapping of the input to the output is learned based on example input-output pairs for the cyberattack (e.g. data labelled as malicious data and other data labelled as regular data). In supervised learning, each example input-output pair consists of an input object (e.g. a data received or generated during a cyberattack) and a desired output value (e.g. labelling as malicious data). A supervised learning model analyzes the training data and produces an inferred function, which can be used for mapping new examples. That is, the supervised machine-learning model is adapted to the cyberattack. Accordingly, the supervised machine-learning model for the cyberattack allows to correctly classify unseen data. For example, the supervised machine-learning model may be a Support-Vector Machine (SVM), a kernel based model, a deep neural network (i.e. a neural network with more than two layers), a k-nearest neighbors (k-nn) model or a Random Forest model. The supervised machine-learning model may be represented by a corresponding data structure.

Method 100 further comprises determining 106 whether the electronic device is under the cyberattack based on the classification of the collected data. For example, it may be determined that the electronic device is under the cyberattack if at least part of the collected data is classified as malicious. Further, it may be determined that the electronic device is under the cyberattack if a count of data classified as malicious per predefined time window exceeds a threshold value. However, it is to be understood that the above decision criteria are merely exemplary and that alternatively one or more other or additional criteria may be used for determining 106 whether the electronic device is under the cyberattack.

Since method 100 is an edge computing method executed at the electronic device itself, the collected data may be processed and analyzed closer to where it is created in contrast to traditional approaches that transfer the data to external data centers or cloud computing platforms. By using the supervised machine-learning model, method 100 may allow to classify the collected data with high accuracy. Method 100 may, hence, allow to determine whether an electronic device is under a cyberattack with high accuracy.

If it is determined that the electronic device is under the cyberattack, method 100 may further comprise instructing the electronic device to initiate a predetermined security routine. The predetermined security routine is one or more actions or processes that serve to prevent or mitigate the effects of the cyberattack against the electronic device or an associated device. For example, the predetermined security routine may comprise ignoring data indicating a certain source Internet Protocol (IP) address or a certain destination IP address, suspending (interrupting, pausing) the data exchange with the communication network, or executing one or more predefined programs or applications at the electronic device.

In some examples, method 100 may further comprise pre-processing the collected data prior to classifying the collected data in order to extract one or more predetermined features from the collected data. The data generated, received, transmitted or processed at/by the electronic device during a cyberattack has specific characteristics, which are denoted as features, related to the nature of the attack. A feature may, e.g., be a specific source IP address, a specific destination IP address, a specific request, a specific flag, etc. contained or indicated by the collected data.

The supervised machine-learning model was trained with these features. For example, the relevant features for a cyberattack may be determined during a research phase when studying the nature of a cyberattack. The supervised machine-learning model classifies the collected data based on the one or more predetermined features extracted from the collected data. Accordingly, the collected data may be classified with high accuracy.

In the following, further details of method 100 will be described with reference to two examples of cyberattacks. The first example is an SSDP reflection and amplification attack (also known as SSDP attack) as an example of a DDoS attack. The SSDP reflection and amplification attack will be described with reference to FIGS. 2 and 3. The second example is a brute force attack, which will be described with reference to FIGS. 4 and 5.

Figure 2:
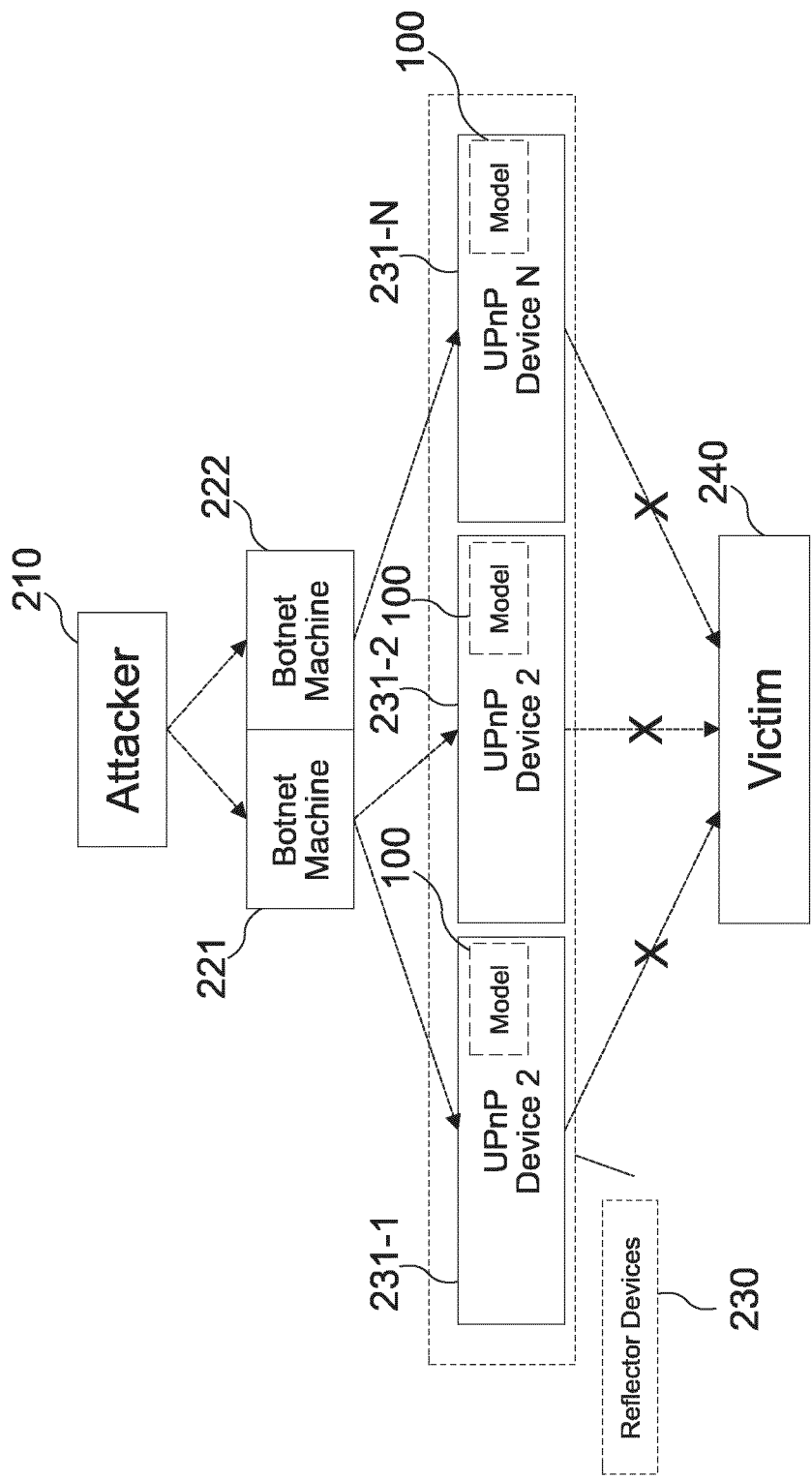
FIG. 2 schematically illustrates a SSDP attack and its detection.

FIG. 2 illustrates the structure of an SSDP reflection and amplification attack. According to the Universal Plug and Play (UPnP) standard, the SSDP is a network protocol for advertisement and discovery of network services. The SSDP is part of the UPnP protocol stack. One of its main goals is to enable connectivity between devices with minimal configuration on the part of the owner. In this regard, it allows devices to connect and start communication automatically.

The SSDP has not been designed with a focus on security. As a result, it presents some known vulnerabilities. The main vulnerability is to use SSDP-capable electronic devices as part of DDoS attacks.

Prior to the actual SSDP attack, an attacker 210 (e.g. a cybercriminal or a secret service) instructs one or more botnet devices 221, 222 to search for SSDP-capable devices over a communication network such as the Internet. This phase is also known as "seeking for reflectors". Common targets for the reflector devices 230 are electronic devices such as home routers, access points, printers, web cameras, IoT devices, etc. A huge number of UPnP devices with SSDP-capability may be used as reflectors 230. For discovering the reflectors 230, the botnet devices 221 and 222 typically scan some ranges of IP addresses, send a message to one of the IP addresses and, usually, to User Datagram Protocol (UDP) port 1900. The botnet devices 221 and 222 store a list of successful replies.

After acquiring the list of potential reflectors 230, the attacker 210 is able to perform the actual SSDP attack against a victim. During the attack phase, the attacker 210 instructs the botnet devices 221 and 222 to send UPnP/SSDP M-SEARCH requests (also denoted as M-SEARCH messages) to each of the reflectors 230. For example, the reflectors 230 may comprise N UPnP device 231-1, 231-2, . . . , 231-N as indicated in FIG. 2 (with N≥2). Accordingly, the attacker 210 instructs the botnet devices 221 and 222 to send a M-SEARCH request to each of the UPnP device 231-1, 231-2, . . . , 231-N.

The M-SEARCH request is used to find out what are the UPnP services executed by a target device. When receiving the M-SEARCH request, the target device replies with a list of UPnP services to the requesting device indicated (identified) in the source IP address field of the M-SEARCH request. This behavior of the target devices is used for the SSDP attack. The botnet devices 221 and 222 fill out the source IP address field with the source IP address of a victim device 240 before sending the M-SEARCH request to the reflectors 230, i.e. UPnP device 231-1, 231-2, . . . , 231-N. Accordingly, the response messages of the reflectors 230 are sent to the victim device 240 but not to the botnet devices 221 and 222. That is, each of the UPnP device 231-1, 231-2, . . . , 231-N replies to the victim device 240 but not to the botnet devices 221 and 222.

Moreover, the botnet devices 221 and 222 typically set one or more flags of the M-SEARCH request to hugely amplify the size of the response messages that are re-directed to the victim device 240. For example, the one or more predefined set flags of the M-SEARCH request may comprise the flags "ssdp:all" and "upnp:rootdevice" for the Search-Target (ST) entry of the M-SEARCH request. The ST entry of the M-SEARCH request allows requesters to ask the target device to specify the categories of SSDP devices or services that they want to query for. By setting the above flags of the ST entry of the M-SEARCH request, it is searched for all kinds of SSDP devices and services in order to hugely amplify the amount and size of response messages.

The huge number of response messages from the UPnP device 231-1, 231-2, . . . , 231-N may cause network congestion at the victim device 240 followed by service interruption.

In order to prevent misuse of the UPnP device 231-1, 231-2, . . . , 231-N for DDoS attacks such as a SSDP reflection and amplification attack, method 100 is run at the UPnP device 231-1, 231-2, . . . , 231-N. In other words, each potential reflector (replicator) is equipped with an instance of the proposed method 100.

The collected data is data packets received by the respective UPnP device 231-1, 231-2, . . . , 231-N (i.e. the respective electronic device under the cyberattack). The supervised machine-learning model executed on the respective UPnP device 231-1, 231-2, . . . , 231-N classifies the incoming data packets (messages) as regular data packets or malicious data packets, i.e. into "normal" or "attack" ones. If it is determined that the respective UPnP device 231-1, 231-2, . . . , 231-N is under the cyberattack (i.e. it is determined that the device is used as reflector, i.e. the UPnP device 231-1, 231-2, . . . , 231-N may also be understood as victim devices or devices under a cyberattack), method 100 may alarm and/or act to prevent the underlying system of the respective UPnP device 231-1, 231-2, . . . , 231-N to provide a response message to the victim device 240. The supervised machine-learning models executed on the UPnP device 231-1, 231-2, . . . , 231-N work independently of each other and only rely on local data present at the respective device they are running on. According to method 100, no user data is exchanged with any external entities such as cloud platforms. Since method 100 operates at the edge-device level instead of the gateway level as in conventional approaches, method 100 may operate on the locally present data and does not have to work with aggregated data formats, such as NetFlow, sFlow, etc. in order to deal with the huge number of network packets. Accordingly, method 100 may prevent losing important information that allows to improve accuracy.

Some relevant features that may allow improving classification accuracy will be described in the following.

One set of features allowing to improve accuracy are features that count the number of data packets grouped by the source IP address in a time window period. That is, the collected data packets may be classified by the supervised machine-learning model based on the number of data packets received by the electronic device per predefined time window, wherein the number of data packets indicate a same source IP address. In other words, the collected data is classified based on the number of data packets received by the electronic device per predefined time window indicating a same source IP address. For example, the predefined time window (time window period) may be 1 second, 15 seconds, 30 seconds, 1 minute, 5 minutes, 15 minutes, 30 minutes, 1 hour, 6 hours, 12 hours or 24 hours. Counting the number of data packets indicating the same source IP address per predefined time window may allow to detect a DDoS attack independent from the used protocol. Therefore, this protocol-independent feature set may be used not only for SSDP attacks but for any DDoS attack regardless of the protocol (e.g. Network Time Protocol, NTP; SSDP; Domain Name System, DNS; etc.)

An SSDP-specific set of features is the above mentioned flags of the ST entry of the M-SEARCH request. There is very often a correlation between the count of data packets indicating a particular device as its origin and using one of these suspicious ST values, and the attack packets. Therefore, the collected data packets may be classified by the supervised machine-learning model further based on the feature that the data packets are UDP packets comprising a M-SEARCH request with one or more predefined set flags such as "ssdp:all" and "upnp:rootdevice" for the ST entry of the M-SEARCH request. In other words, the collected data may be classified based on the number of UDP packets received by the electronic device per predefined time window indicating a same source IP address and comprising a M-SEARCH request with one or more predefined set flags (e.g. "ssdp:all" and "upnp:rootdevice" for the ST entry of the M-SEARCH request).

Figure 3:
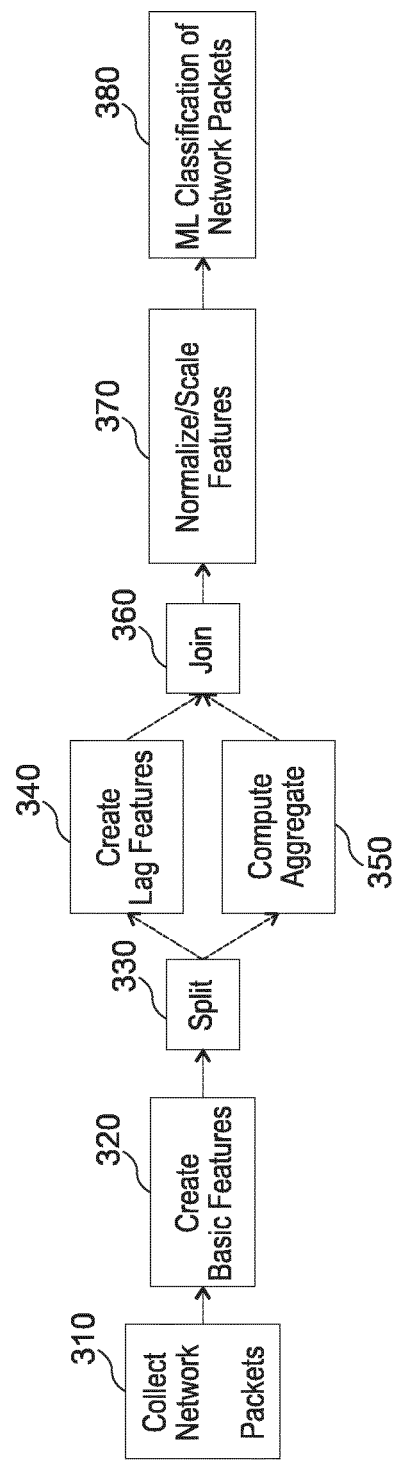
FIG. 3 illustrates an example of data flow at an electronic device.

In FIG. 3, an exemplary data flow for data packets arriving at the electronic device under monitoring is illustrated.

In a first step 310, the data (network) packets arriving at the electronic device are collected. Then, the data packets are pre-processed in order to extract one or more predetermined features from the collected data. The pre-processing comprises a step 320 of creating one or more basic (relevant) features for (from) each data packet (e.g. source IP address, flags of ST entry, etc.). Then the pre-processing is split up in a step 330. In a step 340, lag features for each data packet are created. In parallel, an aggregate, i.e. statistics is determined for the predefined time window in a step 350. In a step 360, the determined information is joined (combined). In a subsequent step 370, the created features are normalized or scaled. The one or more predetermined features obtained via the pre-processing in steps 320 to 370 are then provided to the supervised machine-learning model for classification in a step 380.

Figure 4:
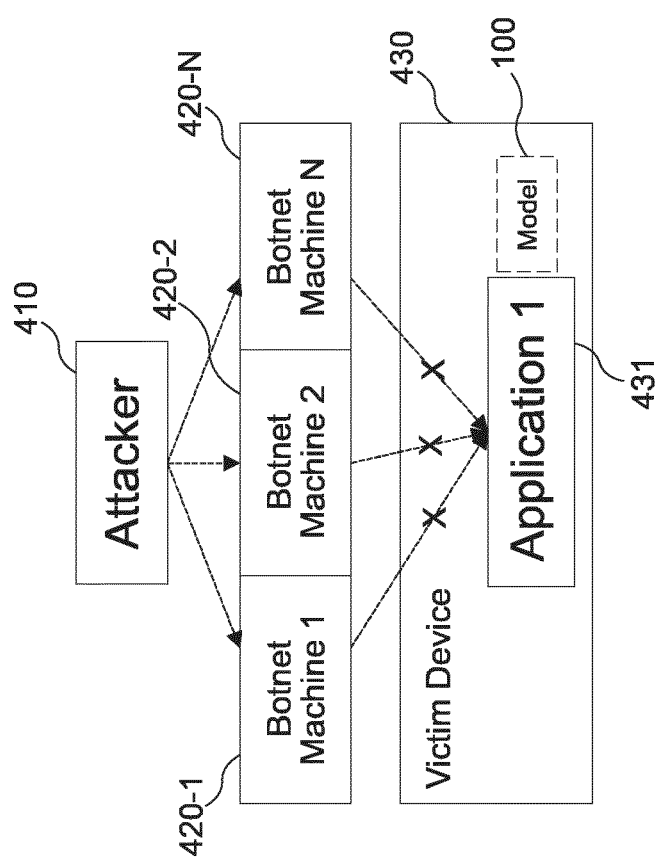
FIG. 4 schematically illustrates a brute force attack and its detection.

FIG. 4 illustrates the structure of a brute force attack. A brute force attack is an activity which involves repetitive attempts of trying various password combinations to break into a computer system and take it over. Common target applications are websites, remote desktop services, remote terminals, database servers, etc. Common target devices are home routers, web cameras, video recorders, cloud servers, etc. Probably the most common way to perform this type of attack is using a botnet infrastructure as illustrated in FIG. 4.

An attacker 410 instructs plural botnet machines (devices) 420-1, 420-2, . . . , 420-N (N≥2) to start scanning for open services over a communication network such as the Internet. This phase is known as "port scanning". After obtaining a list of potential victims, the attacker 410 chooses one victim device 430 running a service or application 431, and sends the command to start the brute force attack to the botnet devices 420-1, 420-2, . . . , 420-N.

Then, the botnet devices 420-1, 420-2, . . . , 420-N start sending login requests to the service 431 running on the victim device 430. There are several variations of this type of attack, such as the usage of lists of common passwords, lists of default passwords for a specific device, lists of username/passwords exposed in data breaches, etc.

The proposed detection of brute force attacks is similar to the above described SSDP attack detection except that method 100 is executed on the victim device 430.

Method 100 is monitoring the application 431 running on the victim device 430 by reading its events. In other words, the data collected by method 100 is application messages (events) generated by the application 431 executed on the electronic device 430. The supervised machine-learning model classifies the application messages as malicious or regular data, i.e. "normal" or "attack" messages. In this respect, method 100 only uses data locally available on the electronic device 430. If attack events are identified, i.e. if it is determined that the electronic device 430 is under the cyberattack, the electronic device 430 is instructed to initiate a predetermined security routine. For example, method 100 may instruct an underlying operational system at the electronic device 430 to stop forwarding malicious messages (e.g. login requests) to the application 431.

A relevant set of features that allows to improve detection accuracy is the number of specific events occurring with a predefined time period. In other words, the number of application messages of a certain (same) type generated by the application per predefined time window may be an indicator for a brute force attack. For example, the application messages of the same type may indicate one of the following types of events: login failed, login succeeded, and internal background job. However, also application messages indicating several other types of events may be monitored. The predefined time window (period) may, e.g., be 30 seconds, 5 minutes, 1 hour, 4 hours or 1 day.

Figure 5:
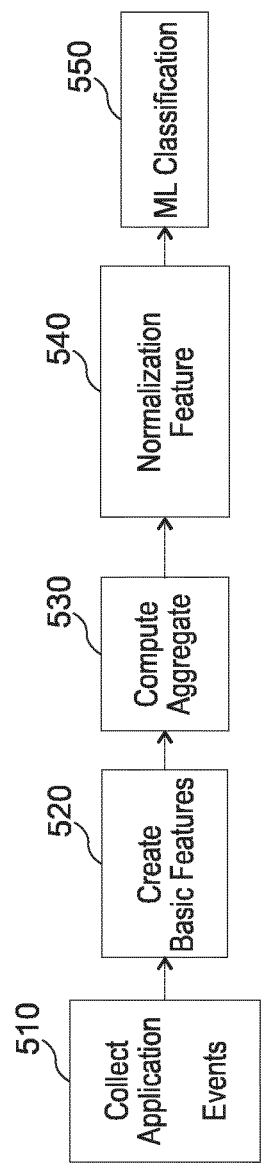
FIG. 5 illustrates another example of data flow at an electronic device.

An exemplary data flow for application messages of an application under monitoring is illustrated in FIG. 5.

In a first step 510, the application messages (indicated events) of an application are collected. Then, the application messages are pre-processed in order to extract one or more predetermined features from the collected data. The pre-processing comprises a step 520 of creating one or more basic (relevant) features for (from) each application message (e.g. type of event indicated by the message). Then, an aggregate, i.e. statistics is determined for the predefined time window in a step 530. In a subsequent step 540, the created features are normalized. The one or more predetermined features obtained via the pre-processing in steps 520 to 540 are then provided to the supervised machine-learning model for classification in a step 550.

Using a Random Forest model for the supervised machine-learning model may be advantageous for detecting SSDP amplification and replication attacks or brute force attacks. A Random Forest model may allow improved accuracy compared to other supervised machine-learning models. Further, a Random Forest model may be more computationally efficient than other supervised machine-learning models such as SVM models, kernel based models or deep neural networks since the Random Forest model provides a set of decision trees which are fast models to be computed. This may be in particular advantageous if method 100 is executed (runs) on low-cost computing devices such as IoT devices having limited memory. In addition, a Random Forest model may allow to abstract data into a more compact model than other machine-learning models such as k-NN models. Also, a Random Forest model may exhibit more robustness to outlier during training and test phase, allow to scale tolerance ability, and exhibit the ability to handle missing data.

The proposed detection of cyberattacks on a device under monitoring may enable a low rate of false positive detections in combination with memory and computationally efficient machine learning models (e.g. for IoT devices). Further, there is no need to send any user data out of the device under monitoring running the proposed detection of cyberattacks, and thus less concerns and obligations about user data protection and privacy may occur. Further, the proposed detection of cyberattacks may allow scalability since the proposed technique is naturally decentralized as it runs on edge devices instead of a centralized device or infrastructure. The proposed technique may further provide economic viability as it is not necessary to keep a huge server-side/ cloud infrastructure with data storages to persist devices' data and computing servers to classify the data.

Figure 6:
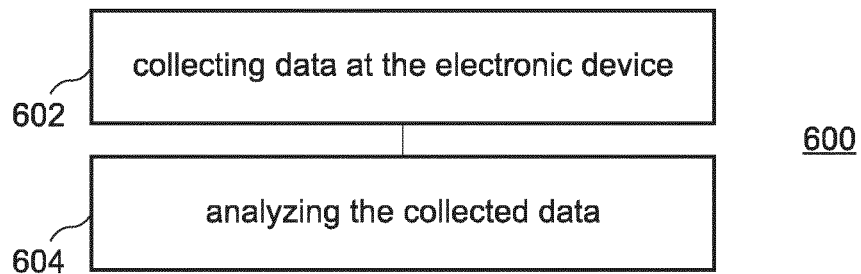
FIG. 6 illustrates a flowchart of another example of a method for detecting a cyberattack on an electronic device.

According to some aspects of the present disclosure, the proposed technique may be embodied by a method 600 for detecting a cyberattack on an electronic device as illustrated by means of a flowchart in FIG. 6. Method 600 comprises collecting 602 data at the electronic device. Further, method 600 comprises analyzing 604 the collected data using a supervised Random Forest model for the cyberattack in order to determine whether the electronic device is under the cyberattack.

As described above, method 600 may be used for detecting a brute force attack or a DDoS attack such as a SSDP reflection and amplification attack at, e.g., an UPnP device and/or an IoT device. Further details of method 600 are described above in connection with FIGS. 2 to 5.

Figure 7:
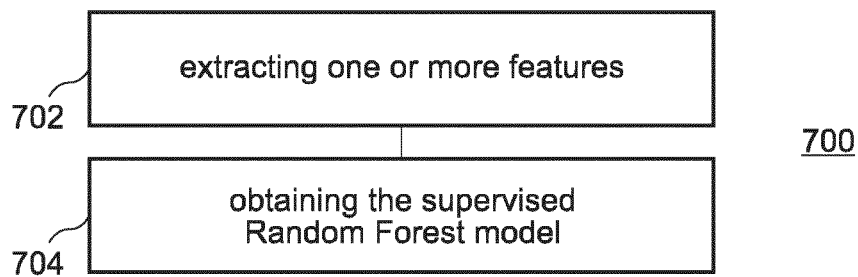
FIG. 7 illustrates a flowchart of an example of a method for obtaining a supervised Random Forest model for detecting a DDoS attack or a brute force attack.

As described above, the supervised Random Forest model for detecting a brute force attack or a DDoS attack such as SSDP reflection and amplification attack may be learned from training data (e.g. collected data of a DDoS attack or a brute force attack). In order to summarize the training phase for obtaining the supervised Random Forest model, FIG. 7 illustrates a flowchart of a method 700 for obtaining a supervised Random Forest model for detecting a DDoS attack or a brute force attack. Method 700 comprises extracting 702 one or more features of the DDoS attack or the brute force attack from collected data of the DDoS attack or the brute force attack (i.e. training data). Further, method 700 comprises obtaining 704 the supervised Random Forest model by learning a plurality of decision trees using the one or more features of the DDoS attack or the brute force attack extracted from the collected data of the DDoS attack or the brute force attack.

Method 700 may allow to obtain a Random Forest model for classifying data at an electronic device under monitoring with high accuracy.

Figure 8:
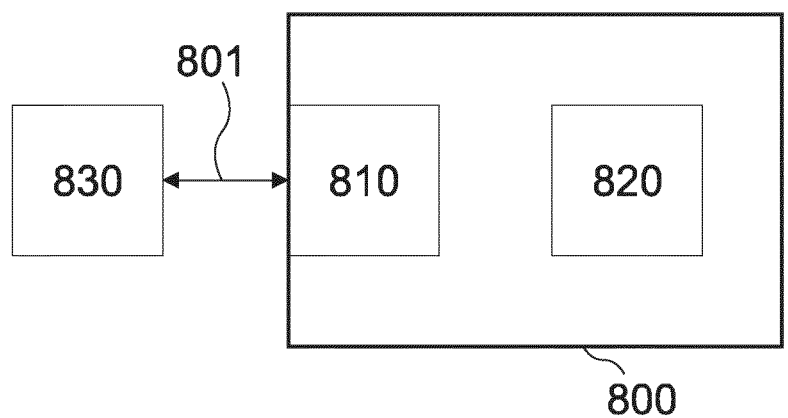
FIG. 8 illustrates an example of an electronic device configured to detect a cyberattack on itself.

An example of an electronic device configured (adapted) to detect a cyberattack on itself is illustrated in FIG. 8. The electronic device 800 comprises a network interface 810 (e.g. implemented as a hardware circuit or as a software interface) for exchanging data 801 with a communication network 830 such as e.g. a LAN, a WLAN, a MAN, a GAN or the Internet.

The electronic device 800 comprises a processing circuit 820. For example, the processing circuit 820 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 820 may optionally be coupled to, e.g., read only memory (ROM) for storing software, random access memory (RAM) and/or nonvolatile memory.

The electronic device 800 may further comprise other hardware—conventional and/or custom.

The processing circuit 820 monitors the electronic device 800 according to the above described technique for detecting cyberattacks. That is, the processing circuit 820 collects data at the electronic device 800 and classifies the collected data as regular data or malicious data using a supervised machine-learning model for the cyberattack (e.g. a Random Forest model). Further, the processing circuit 820 determines whether the electronic device 800 is under the cyberattack based on the classification of the collected data.

For example, the proposed technique for detecting cyberattacks may be deployed as an extension of an operating system service such as a firewall, or as a daemon running as a background process. In both cases, it does not need direct control of an interactive user and its interface need not be directly exposed.

The following examples pertain to further embodiments:

(1) A method for detecting a cyberattack on an electronic device, the method being performed by the electronic device, the method comprising:
collecting data at the electronic device;
classifying the collected data as regular data or malicious data using a supervised machine-learning model for the cyberattack; and
determining whether the electronic device is under the cyberattack based on the classification of the collected data.

(2) The method of (1), wherein the machine-learning model for the cyberattack is a Random Forest model.

(3) The method of (1) or (2), wherein it is determined that the electronic device is under the cyberattack if at least part of the collected data is classified as malicious.

(4) The method of any of (1) to (3), further comprising:
pre-processing the collected data prior to classifying the collected data in order to extract one or more predetermined features from the collected data,
wherein the machine-learning model classifies the collected data based on the one or more predetermined features extracted from the collected data.

(5) The method of any of (1) to (4), wherein the collected data is data received by the electronic device or data generated by the electronic device.

(6) The method of any of (1) to (5), wherein the cyberattack is a Distributed Denial-of-Service, DDoS, attack, wherein the collected data is data packets received by the electronic device, and wherein the collected data is classified based on the number of data packets received by the electronic device per predefined time window.

(7) The method of (6), wherein the number of data packets indicate a same source IP address.

(8) The method of (7), wherein the DDoS attack is a Simple Service Discovery Protocol, SSDP, attack, wherein the data packets are User Datagram Protocol, UDP, packets, and wherein the number of data packets comprise a M-SEARCH request with one or more predefined set flags.

(9) The method of (8), wherein the one or more predefined set flags of the M-SEARCH request comprise the flags "ssdp:all" and "upnp:rootdevice" for the search-target entry of the M-SEARCH request.

(10) The method of any of (1) to (9), wherein the electronic device is a Universal Plug and Play, UPnP, device.

(11) The method of any of (1) to (5), wherein the cyberattack is a brute force attack, wherein the collected data is application messages generated by an application executed on the electronic device, and wherein the collected data is classified based on the number of application messages generated by the application per predefined time window.

(12) The method of (11), wherein the number of application messages are application messages of a same type.

(13) The method of (12), wherein the application messages of the same type indicate one of: login failed, login succeeded, and internal background job.

(14) The method of any of (1) to (13), further comprising:
instructing the electronic device to initiate a predetermined security routine if it is determined that the electronic device is under the cyberattack.

(15) The method of any of (1) to (14), wherein the electronic device is an Internet-of-Things, IoT, device.

(16) A method for detecting a cyberattack on an electronic device, wherein the method is performed by the electronic device, the method comprising:
collecting data at the electronic device; and
analyzing the collected data using a supervised Random Forest model for the cyberattack in order to determine whether the electronic device is under the cyberattack.

(17) The method of (16), wherein the cyberattack is a Distributed Denial-of-Service, DDoS, attack or a brute force attack.

(18) The method of (16) or (17), wherein the electronic device is a Universal Plug and Play, UPnP, device and/or an Internet-of-Things, IoT, device.

(19) A method for obtaining a supervised Random Forest model for detecting a Distributed Denial-of-Service, DDoS, attack or a brute force attack, the method comprising:
extracting one or more features of the DDoS attack or the brute force attack from collected data of the DDoS attack or the brute force attack; and
obtaining the supervised Random Forest model by learning a plurality of decision trees using the one or more features of the DDoS attack or the brute force attack extracted from the collected data of the DDoS attack or the brute force attack.

(20) An electronic device configured to detect a cyberattack on itself, comprising:
a network interface for exchanging data with a communication network; and
a processing circuit configured to:
collect data at the electronic device;
classify the collected data as regular data or malicious data using a supervised machine-learning model for the cyberattack; and
determine whether the electronic device is under the cyberattack based on the classification of the collected data.

(21) A non-transitory machine readable medium having stored thereon a program having a program code for performing the method for detecting a cyberattack on an electronic device according to any of (1) to (18), when the program is executed on a processor or a programmable hardware of the electronic device.

(22) A program having a program code for performing the method for detecting a cyberattack on an electronic device according to any of (1) to (18), when the program is executed on a processor or a programmable hardware of the electronic device.

(23) A non-transitory machine readable medium having stored thereon a program having a program code for performing the method for obtaining a supervised Random Forest model for detecting a Distributed Denial-of-Service, DDoS, attack or a brute force attack according to (19), when the program is executed on a processor or a programmable hardware.

(24) A program having a program code for performing the method for obtaining a supervised Random Forest model for detecting a Distributed Denial-of-Service, DDoS, attack or a brute force attack according to (19), when the program is executed on a processor or a programmable hardware.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for detecting a cyberattack on an electronic device, the method being performed by the electronic device, the method comprising:
collecting data at the electronic device;
classifying the collected data as regular data or malicious data using a supervised machine-learning model for the cyberattack; and
determining whether the electronic device is under the cyberattack based on the classification of the collected data, wherein
the cyberattack is a Distributed Denial-of-Service, DDoS, attack,
the collected data is data packets received by the electronic device, and wherein the collected data is classified based on a number of data packets received by the electronic device per predefined time window,
the number of data packets indicate a same source IP address, the DDoS attack is a Simple Service Discovery Protocol, SSDP, attack, the data packets are User Datagram Protocol, UDP, packets, and the number of data packets comprise a M-SEARCH request with one or more predefined set flags.

2. The method of claim 1, wherein the machine-learning model for the cyberattack is a Random Forest model.

3. The method of claim 1, wherein it is determined that the electronic device is under the cyberattack if at least part of the collected data is classified as malicious.

4. The method of claim 1, further comprising:
pre-processing the collected data prior to classifying the collected data in order to extract one or more predetermined features from the collected data,
wherein the supervised machine-learning model classifies the collected data based on the one or more predetermined features extracted from the collected data.

5. The method of claim 1, wherein the collected data is data received by the electronic device or data generated by the electronic device.

6. The method of claim 1, wherein the one or more predefined set flags of the M-SEARCH request comprise the flags "ssdp:all" and "upnp:rootdevice" for the search-target entry of the M-SEARCH request.

7. The method of claim 1, wherein the electronic device is a Universal Plug and Play, UPnP, device.

8. The method of claim 1, further comprising:
instructing the electronic device to initiate a predetermined security routine if it is determined that the electronic device is under the cyberattack.

9. The method of claim 1, wherein the electronic device is an Internet-of-Things, IoT, device.

10. A method for detecting a cyberattack on an electronic device, the method being performed by the electronic device, the method comprising:
collecting data at the electronic device;
classifying the collected data as regular data or malicious data using a supervised machine-learning model for the cyberattack; and
determining whether the electronic device is under the cyberattack based on the classification of the collected data, wherein
the cyberattack is a brute force attack,
the collected data is application messages generated by an application executed on the electronic device,
the collected data is classified based on a number of application messages generated by the application per predefined time window, and
the number of application messages are application messages of a same type.

11. The method of claim 10, wherein the application messages of the same type indicate one of: login failed, login succeeded, and internal background job.

12. A method for detecting a cyberattack on an electronic device, wherein the method is performed by the electronic device, the method comprising:
collecting data at the electronic device;
analyzing the collected data using a supervised Random Forest model for the cyberattack in order to determine whether the electronic device is under the cyberattack;
determining whether the cyberattack a Distributed Denial-of-Service, DDoS, attack or a brute force attack; and
in response to the cyberattack being a DDoS, attack,
the collected data is data packets received by the electronic device, and wherein the collected data is classified based on a number of data packets received by the electronic device per predefined time window,
the number of data packets indicate a same source IP address, the DDoS attack is a Simple Service Discovery Protocol, SSDP, attack,
the data packets are User Datagram Protocol, UDP, packets, and
the number of data packets comprise a M-SEARCH request with one or more predefined set flags; and
in response to the cyberattack being a brute force attack,
the collected data is application messages generated by an application executed on the electronic device,
the collected data is classified based on the number of application messages generated by the application per predefined time window, and
the number of application messages are application messages of a same type.

13. The method of claim 12, wherein the electronic device is a Universal Plug and Play, UPnP, device and/or an Internet-of-Things, IoT, device.

14. The method of claim 12, further comprising initiating a predetermined security routine in response to determining that the electronic device is under the cyberattack.

15. A method for obtaining a supervised Random Forest model for detecting a cyberattack which is a Distributed Denial-of-Service, DDoS, attack or a brute force attack on an electronic device, the method comprising:
extracting one or more features of the DDoS attack or the brute force attack from collected data of the DDoS attack or the brute force attack;
obtaining the supervised Random Forest model by learning a plurality of decision trees using the one or more features of the DDoS attack or the brute force attack extracted from the collected data of the DDoS attack or the brute force attack;
determining whether the cyberattack a Distributed Denial-of-Service, DDoS, attack or a brute force attack; and
in response to the cyberattack being a DDoS, attack,
the collected data is data packets received by the electronic device, and wherein the collected data is classified based on a number of data packets received by the electronic device per predefined time window,
the number of data packets indicate a same source IP address, the DDOS attack is a Simple Service Discovery Protocol, SSDP, attack,
the data packets are User Datagram Protocol, UDP, packets, and
the number of data packets comprise a M-SEARCH request with one or more predefined set flags; and
in response to the cyberattack being a brute force attack,
the collected data is application messages generated by an application executed on the electronic device,
the collected data is classified based on a number of application messages generated by the application per predefined time window, and the number of application messages are application messages of a same type.

16. The method of claim 15, further comprising initiating a predetermined security routine in response to determining that the electronic device is under the cyberattack.

17. An electronic device configured to detect a cyberattack on itself, comprising:
a network interface for exchanging data with a communication network; and a processing circuit configured to:
  collect data at the electronic device;
  classify the collected data as regular data or malicious data using a supervised machine-learning model for the cyberattack; and
determine whether the electronic device is under the cyberattack based on the classification of the collected data, wherein
when the cyberattack is a Distributed Denial-of-Service, DDoS, attack,
  the collected data is data packets received by the electronic device,
and wherein the collected data is classified based on a number of data
packets received by the electronic device per predefined time window,
  the number of data packets indicate a same source IP address,
  the DDOS attack is a Simple Service Discovery Protocol, SSDP, attack, the data packets are User Datagram Protocol, UDP, packets, and
  the number of data packets comprise a M-SEARCH request with one or more predefined set flags, and
when the cyberattack is a brute force attack,
  the collected data is application messages generated by an application executed on the electronic device,
  the collected data is classified based on a number of application messages generated by the application per predefined time window, and
  the number of application messages are application messages of a same type.

18. The electronic device of claim 17, wherein the processing circuit is configured to initiate a predetermined security routine if it is determined that the electronic device is under the cyberattack.

19. The electronic device of claim 17, wherein the electronic device is an Internet-of-Things, IoT, device.

20. The electronic device of claim 17, wherein the electronic device is a Universal Plug and Play, UPnP, device.

* * * * *